(No Model.)
G. W. SOULÉ.
TIRE TIGHTENER.
No. 581,180. Patented Apr. 20, 1897.
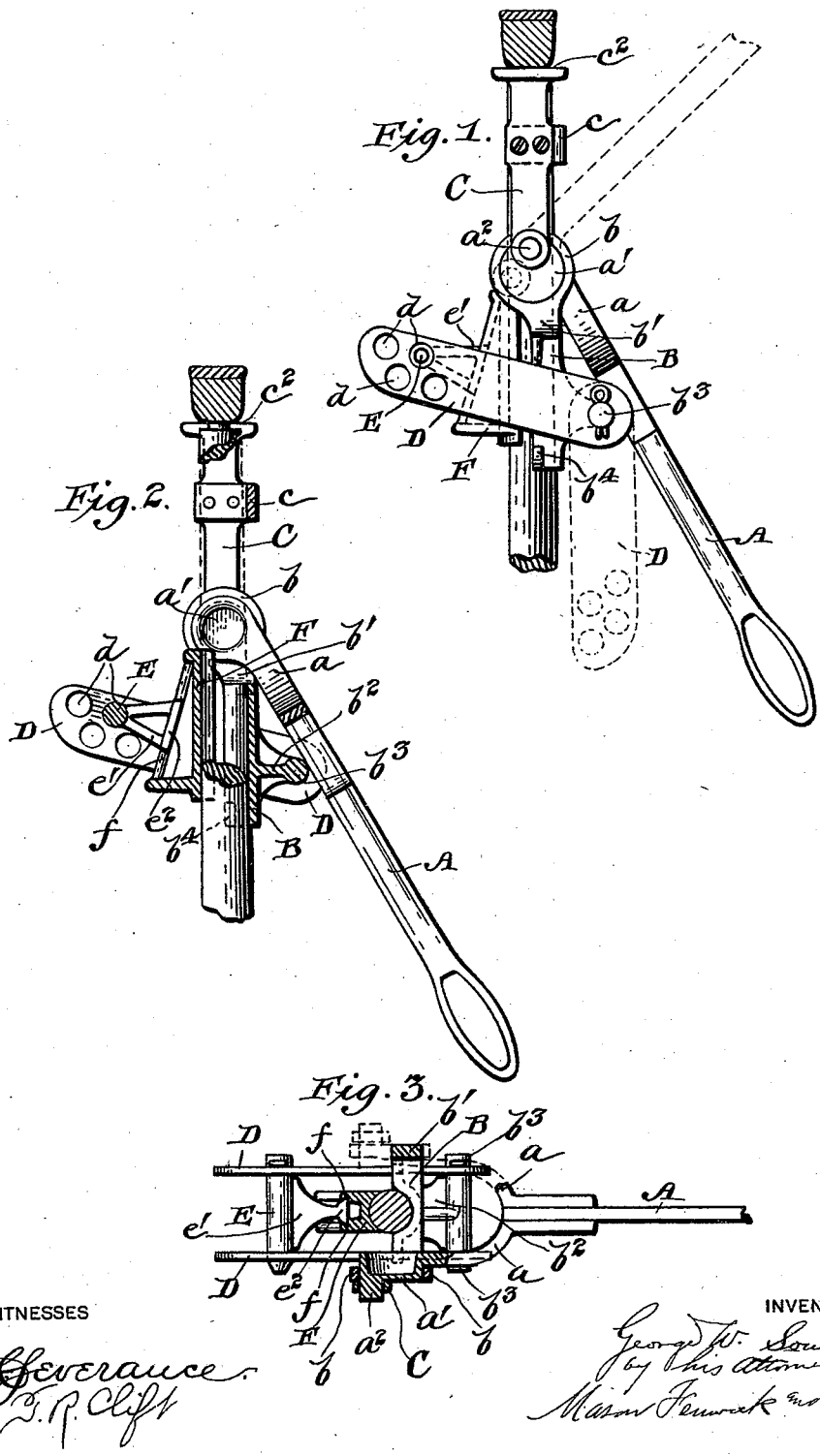

UNITED STATES PATENT OFFICE.

GEORGE W. SOULÉ, OF MERIDIAN, MISSISSIPPI.

TIRE-TIGHTENER.

SPECIFICATION forming part of Letters Patent No. 581,180, dated April 20, 1897.

Application filed October 23, 1896. Serial No. 609,797. (No model.)

*To all whom it may concern:*

Be it known that I, GEORGE W. SOULÉ, a citizen of the United States, residing at Meridian, in the county of Lauderdale and State of Mississippi, have invented certain new and useful Improvements in Tire-Tighteners; and I do hereby declare the following to be a full, clear, and exact description of the invention, such as will enable others skilled in the art to which it appertains to make and use the same.

My invention relates to implements for tightening tires on wheels; and it consists of certain novel constructions, combinations, and arrangements of parts, as will be hereinafter described and specifically claimed, whereby the felly of the wheel is adapted to be raised from its seat on the shoulders of the spokes and washers inserted between the shoulders and the felly, and the tire thereby tightened.

In the accompanying drawings, Figure 1 is a side elevation of my improved tire-tightener. Fig. 2 is a longitudinal section through the implement. Fig. 3 is a horizontal cross-section through the spoke-clamping device and through one of the eccentrics.

A in the drawings represents a handle or lever which is formed at its inner end with branching arms $a\ a$. These arms are provided with disks $a'$, and these disks are provided with laterally-extending eccentrically-arranged pins $a^2$. These disks $a'$ are journaled in eyes $b$, formed in the upper end of the branching arms $b'$ of the vertical support B, and revolve in said eyes. Lifting-straps C C are pivoted on the eccentrically-arranged pins $a^2$. These straps are connected near their upper ends by a band $c$ and are provided at their upper ends with seats $c^2$, which bear against the under side of the felly of a wheel upon which the tire is to be tightened.

The support B is provided with a rear extension $b^2$, which terminates in laterally-extending journals $b^3$, and this support is also provided at its lower end, when the implement is in an operative position, with laterally-extending lugs $b^4$. The interior surface of this support is concaved its entire length to partly surround a spoke, as shown in the drawings and as will be hereinafter more fully described.

Side bars or straps D are pivoted on the journals $b^3$ at their rear ends. These straps are provided near their forward ends with one or more coinciding holes $d$, into two of which a pin E is inserted. This pin is held connected to one of the bars or straps by means of a cotter $e$, as shown in the drawings. The pin E is formed with a rear extension $e'$, having a head $e^2$, which fits and slides in grooves $f$, formed in the rear of a wedge-shaped block or jaw F. This block or jaw is provided on its inner face with a recess which extends the entire length of the same to correspond to the recess formed in the support B and forms with the same an opening for the reception of a spoke, as shown in the drawings. From this it will be seen that the part marked B and termed a "support" also serves as a clamping-jaw.

From the aforegoing description it will be understood that the block or jaw F can be adjusted vertically to fit different-sized spokes and to be snugly clamped on the same. By providing a plurality of holes in the said bars or straps D the wedge block or jaw can be adjusted in and out and up and down to meet different required adjustments for various-sized spokes. The lugs $b^4$ on the support B sustain the side straps or bars D at approximately a right angle with the body of the implement when in an operative position to facilitate getting the clamp around the spoke. The side strap or bar D is free to be removed from the pin E, and the lug $b^4$ on this side of the implement is made short enough to permit the strap to be lowered into a vertical position, as shown in dotted lines in the drawings. When the implement is in this position, it can be readily placed around a spoke and the wedge block or jaw slipped up to any desired position and surround the spoke and the strap which has been lowered returned to a horizontal position and held in place by the pin E. The straps C are brought into a vertical position beneath the felly with the lever in a raised position. By bearing down on the lever the straps will be raised and the spoke tightly grasped by the jaws and the felly lifted up from its seat on a shoulder on one of the spokes. The eccentric-pins $a^2$ are so located upon the disks $a'$ that when the handle or lever is in its lowest position these pins are only on a vertical plane with the same, so that the straps and eccentric-pins will remain in this position without being held with the hand. While the implement is in this position a washer is slipped onto the spoke between the shoulder of the spoke and the under side of the felly. The handle or lever is then raised and the sliding wedge block or jaw loosened from the spoke and the implement removed. The operation is repeated upon any number of spokes until the tire is completely tightened.

Having now described my invention, what I claim as new, and desire to secure by Letters Patent, is—

1. A tire-tightener comprising in its construction a suitable lever provided with eccentrically-arranged pins, straps connected to said pins and adapted to be brought in contact with the under side of a felly, and means for clamping a spoke, substantially as described.

2. A tire-tightener comprising in its construction a suitable lever provided with eccentrically-arranged pins, straps connected to said pins and adapted to be brought in contact with the under side of a felly and lift the same, and means for clamping a spoke, the eccentrically-arranged pins being located at such points that when the lever is at its lowest position, the straps will be in substantially a vertical plane with the axes of the eccentrics, substantially as described.

3. A tire-tightener comprising in its construction a suitable lever provided with eccentrically-arranged pins, lifting-straps connected to said pins and adapted to be brought in contact with the under side of a felly and lift the same, pivoted jaws for clamping a spoke and movable means for admitting of the introduction of a spoke between the jaws, substantially as described.

4. A tire-tightener comprising in its construction a suitable lever provided with eccentrically-arranged pins, lifting-straps connected to the said pins and adapted to be brought in contact with the under side of a felly and lift the same, jaws for clamping a spoke, one of said jaws being wedge-shaped and adjustable vertically, substantially as described.

5. In a tire-tightener the combination of a bifurcated lever and a lifting-link connected to each arm of the bifurcated portion of said lever for lifting the felly upon each side of the spoke, jaws for clamping a spoke, one of said jaws being vertically adjustable, substantially as described.

6. In a tire-tightener the combination of a suitable lever and means connected to said lever for lifting the felly, jaws for clamping a spoke, one of said jaws comprising an adjustable pivotally-mounted portion provided with a head and a wedge-shaped portion having a longitudinal groove, for engaging said head portion whereby said portions are adjustable laterally and vertically, substantially as described.

7. In a tire-tightener the combination with a suitable lever and means connected to said lever for lifting the felly, of jaws for clamping a spoke, one of said jaws being adjustable vertically and laterally, a horizontally-arranged pin connected to the wedge-shaped jaw and upon which it slides, side straps provided with adjusting-holes into which the said pin is adapted to be inserted, substantially as described.

8. In a tire-tightener the combination of a suitable lever and means connected to the said lever for lifting the felly, jaws for clamping a spoke, one of said jaws being provided at its lower end with laterally-extending lugs, and the other jaw being adjustable vertically, substantially as described.

In testimony whereof I hereunto affix my signature in presence of two witnesses.

GEORGE W. SOULÉ.

Witnesses:
 JOHN T. POPE,
 CLYDE SOULÉ.